Jan. 23, 1945.  G. E. FRANCK  2,367,935
FILTER
Filed Feb. 26, 1943
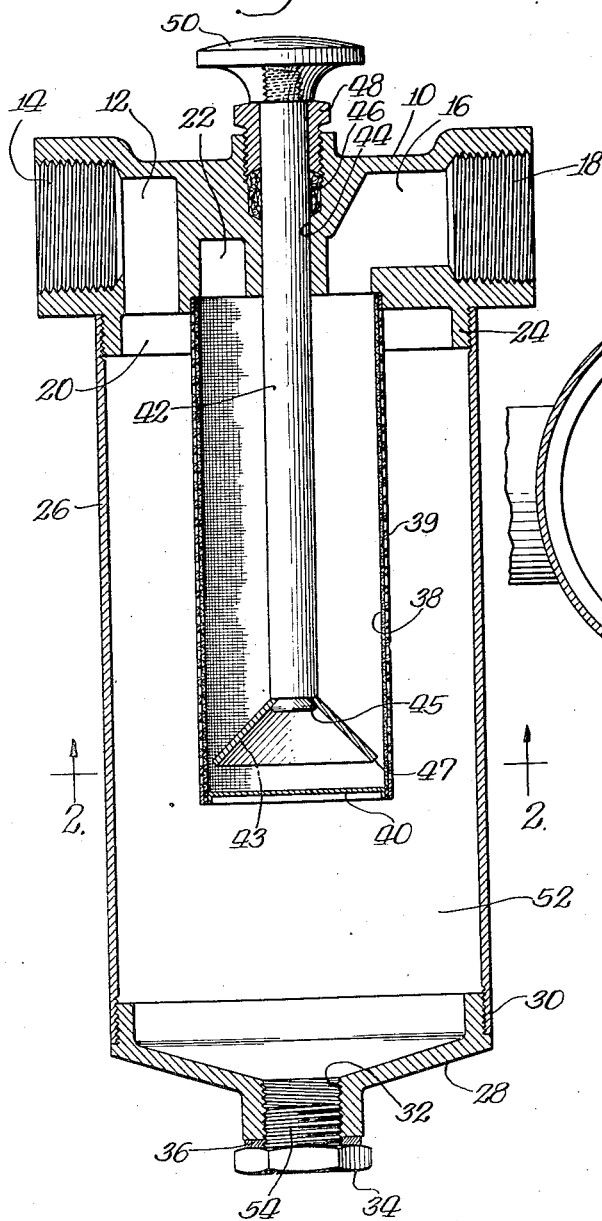
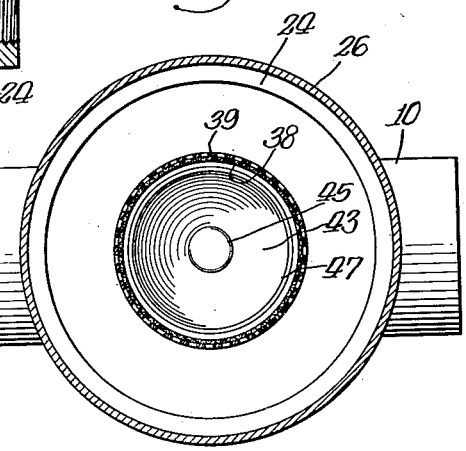
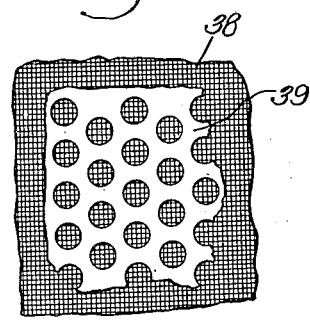
INVENTOR.
George E. Franck,
BY
Vernon D. Beebler
Atty.

Patented Jan. 23, 1945

2,367,935

UNITED STATES PATENT OFFICE 2,367,935

FILTER

George E. Franck, Riverside, Ill., assignor to The Imperial Brass Manufacturing Company, Chicago, Ill., a corporation of Illinois Application February 26, 1943, Serial No. 477,182

5 Claims. (Cl. 210—167)

My invention relates to filters for liquids and particularly filters which are permanently connected into a liquid line.

Among the objects of my invention is to provide a new and improved filter which can be permanently connected into a fluid line and in which the filtering medium can be periodically cleaned without it being necessary to interrupt the flow of fluid through the line.

Another object of my device is to provide a new and improved filter for permanent installation in a fluid line wherein a cleaning element is placed adjacent the filtering medium in such a position that it can periodically reverse the flow of fluid through the filtering medium in order to wash sediment from the filtering medium and keep the filter sufficiently clean so that it can function for long periods at a time without overhandling or replacement.

Still another object of my device is to provide a new and improved filter containing a specially designed and reenforced filter screen so positioned around a cleaning plunger that when the plunger is operated to temporarily and periodically reverse the flow of fluid through the filtering screen, there will be no suction created by the cleaning plunger which would tend to accelerate the flow of fluid through the filtering screen and thereby force sediment and dirt into an outlet passage; there being also included as an object the provision of a trap or sump where the sediment from the numerous periodic filter cleaning operations can be collected without it being necessary to open up and empty the filter device each time.

With these and other objects in view, my invention consists in the construction, arrangement and combination of the various parts of my device whereby the objects contemplated are attained, as hereinafter more fully set forth, pointed out in my claims and illustrated in the accompanying drawing, in which:

Figure 1 is a longitudinal sectional view of my device in its normal position.

Figure 2 is a cross section of my device taken on line 2—2 of Figure 1 looking in the direction of the arrows.

Figure 3 is a fragmentary elevational view of the filtering medium.

Filtering devices have been used in fluid lines for a great many years for the purpose of eliminating from fluids any dirt or sediment which may be picked up by the fluid during its passage through the fluid line. There have likewise been attempts in the past to provide a self cleaning filter which would permit cleaning the filtering medium, as for example reversing the flow of fluid for a short length of time. For the most part these attempts have been unsuccessful because careful attention was not given to the filter cleaning plunger operation so as to eliminate possible eddies and suction effects which would cause a turbulence in the fluid line adjacent the filtering medium. the turbulence created in devices of the type referred to agitate the liquid to such an extent that some of the dirt is invariably forced through the filter and the purpose for which the filter is placed in the fluid line is defeated. These defects in the prior art have been remedied by my invention.

In the drawing there is shown a body 10 customarily made from a casting and provided with an inlet passage 12 having a threaded port 14 and an outlet passage 16 having a threaded outlet port 18.

As shown in Figure 1, the inlet passage within the body has the shape of an annular space 20 and the outlet passage at its inside end takes the shape of an annular space 22.

The body is provided with a short threaded circular flange 24, and a cylindrical structure 26 is threadably attached to the flange and extends downwardly from the body 10. The cylindrical structure forms a chamber 52, the bottom of which consists of a casting 28 threadably attached at 30 to the threaded lower end. Centrally disposed within the casting 28 is a threaded aperture 32 in which a plug 34 is inserted and sealed by means of a washer 36. The cylindrical structure thus provides a chamber having a cross-sectional diameter greater than the diameter of the inlet thus permitting a change in the velocity of the fluid sufficient to deposit out a portion of the sediment.

Within the chamber there is provided a cylindrical filtering medium. This medium may be built of an inside cylindrical wall 38 of a relatively fine mesh screen and an outer wall 39 having coarser perforations and relatively great rigidity placed in face to face contact with the inner fine mesh screen in order to lend rigidity and strength to the relatively fine mesh structure of the inner screen.

At their respective tops the inner fine mesh screen and the outer coarse mesh screen are attached to the body at a position surrounding the annular outlet passage 22. The bottom of the cylindrical screen structure is closed by means of an imperforate disc 40, preferably of sheet material which is sealed at its circumferential edge to the bottom circumference of the screen member.

Within the screen chamber is provided a reciprocating plunger for filter cleaning purposes. The plunger includes a piston 42 reciprocably mounted in a piston hole 44 in the body. The piston hole is provided with a packing 46 held in place by means of a stuffing nut 48. The outside or upper end of the piston is provided with a handle 50, threadably attached to it.

At the lower end of the piston there is provided a cup-like head 43 having a frustoconical shape and rigid walls. The large end of the cone points downwardly and the smaller end of the cone extends upwardly into engagement with the lower end of the piston 42. It should be noted that there is considerable space within the chamber 52 to permit the velocity of a fluid passing thereinto from the inlet passage 40 to drop rapidly and thereby cause sedimentation of much of the solid impurities. Due to the fact that the entire top wall of the filtering medium is sealed into the body surrounding the annular outlet passage 22 and inside the annular inlet space 20, no fluid will pass through the line until it has been filtered by the filtering medium.

It will be noted further that the lower end of the piston 42 has the rigid cup-like head attached at its smaller or upper end 45 to the bottom end of the piston. The large end 47 has a fixed shape and is substantially smaller than the inside diameter of the filter. This construction is designed to avoid accidental suction currents such as might be set up if there were employed a plunger fitting relatively close to or scraping against the inside wall of the filter member. The cup-like head is preferably made stiff and rigid so that it will not flex during use and will therefore not spread outwardly into contact with the surrounding cylindrical wall defined by the fine mesh filter screen 38. It should also be noted that while in normal position, in addition to the space between the circumference of the large end of the plunger head and the inside wall of the screen, there is also a substantial distance between the lowermost edge of the cup-like head and the sheet metal bottom 44 of the filter member.

In operation the filter device is normally connected into a fluid line by means of the threaded connections 14 and 18 of the body portion. As fluid flows into the inlet passage 12, it passes into the chamber 52 where the velocity is substantially decreased thereby causing the depositing out of many of the heavier particles. As fluid continues to flow, it will pass through the filtering screens 38 and 39 and thence upwardly within the cylindrical filtering medium and outwardly through the outlet passage 16.

Whenever the filtering screens become unduly clogged, it is necessary only to grasp the handle 50 and work the cup-like head up and down to dislodge the filtered particles. The sediment which falls to the bottom of the chamber 52 can be removed from time to time by removing the plug 54.

It is important to note that due to the fact that the head is rigid, it will remain fixed in its position within the cylindrical filter member. When the piston 42 is worked up and down, the cup-like head 43 is reciprocated back and forth adjacent the inside screen surface, the diameter of the lower outside edge, however, being small enough so that there is an opening left between the circumference of the head and the surface of the innermost screen. In rest position, the head 43 remains at a substantial distance above the bottom 40 of the chamber. As the plunger is worked up and down, liquid already in the chamber is forced outwardly in a reverse direction and dislodges particles which otherwise might creep through the filter and continue on into the outlet passage. Having the rigid cup-like conical member in a position spaced a slight distance from both the bottom and side walls of the cylindrical screen, reduces to some extent the effect of the suction and makes certain that the major force of the pumping stroke of the piston will be used to force a temporary reversal of flow through the filtering screen. By permitting fluid to pass around the sides of the cone 43, a momentary suction effect of increased magnitude on the filter will be avoided. This action eliminates a surge of liquid into the filter chamber which would tend to force impurities into the filter chamber from the surrounding chamber. All of the particles which are thus dislodged by a reverse flow may fall down to the bottom of the chamber 52, and when a sufficient quantity has collected, the particles can be drawn off when the plug 34 is unscrewed from the bottom of the tube structure.

There has thus been provided a filter device designed to operate in such a manner that during cleaning operations no filtered particles can be forced through the screen into the outlet passage.

Some changes may be made in the arrangement and construction of the various parts of my invention without departing from the real spirit and purpose of my invention, and it is my intention to cover by my claims, any modified forms of structure or use of mechanical equivalents which may be reasonably included within their scope.

I claim as my invention:

1. A filter comprising a body having an inlet passage, an outlet passage, and a central piston hole, an enclosing structure depending therefrom forming a chamber communicating with both said inlet and said outlet passages, and a normally closed clean-out opening in the structure, a filter screen member in said enclosing structure comprising a filter screen, one end of said screen being attached to the body between the outlet and inlet passages and the other end thereof being closed by an imperforate bottom, and a plunger comprising a piston extending through the piston hole in the body and slidably mounted therein, a packing for sealing the piston hole, a handle at the outside end of the piston and a head at the inside end of the piston of relatively stiff material, the rim of said head being inexpendable and spaced throughout the plunger stroke at a substantial distance from the inner surface of the screen and having a position at the lower end of the plunger stroke above the imperforate bottom of the screen chamber.

2. A filter comprising a body having an inlet passage, an outlet passage, and a central piston hole, a tube structure depending from the body hole forming a chamber communicating with said inlet and said outlet passages, a bottom for said tube structure and an opening in the tube structure having a removable plug therein, a screen chamber in said tube comprising an inside elongated screen of relatively fine mesh and a relatively rigid outside reinforcing screen in contact therewith attached to the body between the inlet passage and the outlet passage, the upper end of said inside screen being attached to the body between the outlet and inlet passages and the lower end thereof being closed by an imperforate closure of sheet material spaced above the bottom of the tube structure, and a plunger comprising a piston extending through the piston hole in the body and slidably mounted therein, a packing for sealing the piston hole, a handle at the outside end of the piston and an inverted cup-like head at the inside end of the piston of relatively stiff material, the wide end of said head being inexpandable and spaced throughout the plunger stroke at a substantial distance from the inner surface of the fine mesh screen and having a position at the lower end of the plunger stroke above the imperforate bottom of the screen chamber, the small end of said head being rigidly attached to the lower end of said piston.

3. A filter comprising a body having an inlet passage, an outlet passage, and a central piston hole, a cylindrical tube structure depending from the body forming a chamber communicating with said inlet and said outlet passages, a bottom for said tube and an opening in the bottom having a removable plug therein, a screen chamber concentrically disposed within said tube comprising an inside cylindrical screen of relatively fine mesh and an outside screen of relatively coarse mesh in contact therewith, the upper ends of said screens being attached to the body between the outlet and inlet passages and the lower ends thereof being closed by an imperforate closure of sheet material spaced a substantial distance above the bottom, and a plunger comprising a piston extending through the piston hole in the body and slidably mounted therein, a friction packing for sealing the piston hole, a handle at the outside end of the piston and an inverted cup-like head at the inside end of the piston of relatively stiff sheet material substantially frusto-conical in shape, the wide end of said head being inexpandable and spaced throughout the plunger stroke at a substantial distance from the inner surface of the fine mesh screen and having a position at the lower end of the plunger stroke a substantial distance above the imperforate bottom of the screen chamber, the small end of said frusto-conical head being rigidly attached to the lower end of said piston.

4. A filter comprising a body having an inlet passage, an outlet passage and a piston hole, an enclosing structure depending therefrom forming a chamber communicating with both said inlet and said outlet passages, a filter screen member in said enclosing structure comprising a filter screen, one end of said screen being attached to the body between the outlet and inlet passages and the other end thereof being closed by an imperforate bottom, and a plunger comprising a piston extending through the piston hole in the body and slidably mounted therein, a packing for sealing the piston hole, a handle at the outside end of the piston and a head at the inside end of the piston of relatively stiff material, the rim of said head being inexpandable and spaced throughout the plunger stroke at a substantial distance from the inner surface of the screen and having a position at the lower end of the plunger stroke above the imperforate bottom of the screen chamber.

5. A filter comprising a body having an inlet passage, an outlet passage and a piston hole, an enclosing structure depending therefrom forming a chamber communicating with both said inlet and said outlet passages, a filter screen member in said enclosing structure comprising a filter screen, one end of said screen being attached to the body between the outlet and inlet passages and a bottom at the other end of the screen, a plunger comprising a piston extending through the piston hole in the body and slidably mounted therein, a packing for sealing the piston hole, a handle at the outside end of the piston and a head at the inside end of the piston of relatively stiff material, the rim of said head being inexpandable and spaced throughout the plunger stroke at a substantial distance from the inner surface of the screen and having a position at the lower end of the plunger stroke above the bottom of the screen chamber.

GEORGE E. FRANCK.